(12) United States Patent
Chuang et al.

(10) Patent No.: US 7,891,856 B2
(45) Date of Patent: Feb. 22, 2011

(54) OPTICAL FILM

(75) Inventors: Shih-Yi Chuang, Kaohsiung (TW); Guo-Long Wu, Kaohsiung (TW)

(73) Assignee: Eternal Chemical Co., Ltd. (TW)

( * ) Notice: Subject to any disclaimer, the term of this patent is extended or adjusted under 35 U.S.C. 154(b) by 79 days.

(21) Appl. No.: 11/895,499

(22) Filed: Aug. 24, 2007

(65) Prior Publication Data

US 2008/0055937 A1 Mar. 6, 2008

(30) Foreign Application Priority Data

Aug. 28, 2006 (TW) .............................. 95131674 A (51) Int. Cl.
*G02F 1/1335* (2006.01)
*G02B 27/10* (2006.01)
*F21V 7/04* (2006.01)
*F21V 5/00* (2006.01)

(52) U.S. Cl. ................ 362/627; 362/330; 362/339; 349/62; 359/619

(58) Field of Classification Search ................ 362/606, 362/627, 330, 339; 349/62; 359/599, 619; 385/129, 130, 146
See application file for complete search history.

(56) References Cited

U.S. PATENT DOCUMENTS

| | | | |
|---|---|---|---|
| 5,771,328 A | 6/1998 | Wortman et al. | |
| 5,919,551 A | 7/1999 | Cobb, Jr. et al. | |
| 6,354,709 B1 | 3/2002 | Campbell et al. | |
| 7,106,517 B2 * | 9/2006 | Olczak | 359/599 |
| 7,230,764 B2 * | 6/2007 | Mullen et al. | 359/619 |
| 7,366,393 B2 * | 4/2008 | Cassarly et al. | 385/146 |
| 7,384,173 B2 * | 6/2008 | Whitney | 362/330 |
| 7,397,605 B2 * | 7/2008 | Mai | 359/599 |
| 7,448,776 B2 * | 11/2008 | Tang | 362/339 |
| 7,527,407 B2 * | 5/2009 | Mai | 362/606 |
| 2005/0024849 A1 | 2/2005 | Parker | |
| 2005/0140860 A1 | 6/2005 | Olczak | |
| 2005/0141243 A1 | 6/2005 | Mullen | |
| 2005/0225865 A1 | 10/2005 | Olczak | |
| 2006/0210726 A1 | 9/2006 | Jones et al. | |
| 2007/0010594 A1 * | 1/2007 | Wang et al. | 522/182 |
| 2008/0225394 A1 * | 9/2008 | Lin et al. | 359/599 |

FOREIGN PATENT DOCUMENTS

| | | |
|---|---|---|
| TW | M277950 | 10/2005 |
| TW | 200612158 A | 4/2006 |
| WO | 2006/073616 | 7/2006 |

\* cited by examiner

*Primary Examiner*—Jong-Suk (James) Lee
*Assistant Examiner*—David R Crowe
(74) *Attorney, Agent, or Firm*—Ladas & Parry LLP (57) ABSTRACT

The subject invention provides an optical film comprising a transparent substrate and a structured surface layer, wherein the structured layer is positioned on the upper surface of the substrate and comprises a plurality of non-parallel, adjacent columnar structures. The optical film according to the subject invention can effectively enhance the brightness of a liquid crystal display and reduce the optical interference.

19 Claims, 8 Drawing Sheets

Prior Art

FIG. 1

Prior Art

OPTICAL FILM

BACKGROUND OF THE INVENTION

1. Field of the Invention

The present invention relates to an optical film applicable to a flat display.

2. Description of the Prior Art

Since liquid crystal display (LCD) panels cannot emit light, backlight modules serving as brightness sources become an important element for liquid crystal displays (LCDs), and are also quite important for enhancing display brightness. In the industry, there are many attempts to enhance the brightness of LCD panels, for example, by increasing the number of lamps. However, the increase of the number of lamps will easily result in an excessive heat accumulation in LCDs, and thus affect the service life and quality of other elements. Meanwhile, due to large power consumption, the demands associated with many information products that use batteries to provide power when not being connected to power line cannot be fulfilled. Currently, various optical films are used in backlight modules to enhance the brightness of LCD panels and maximize the efficiency of the light sources, without altering any element design or consuming additional energy. This approach has become the most economical and convenient solution.

Figure 1:
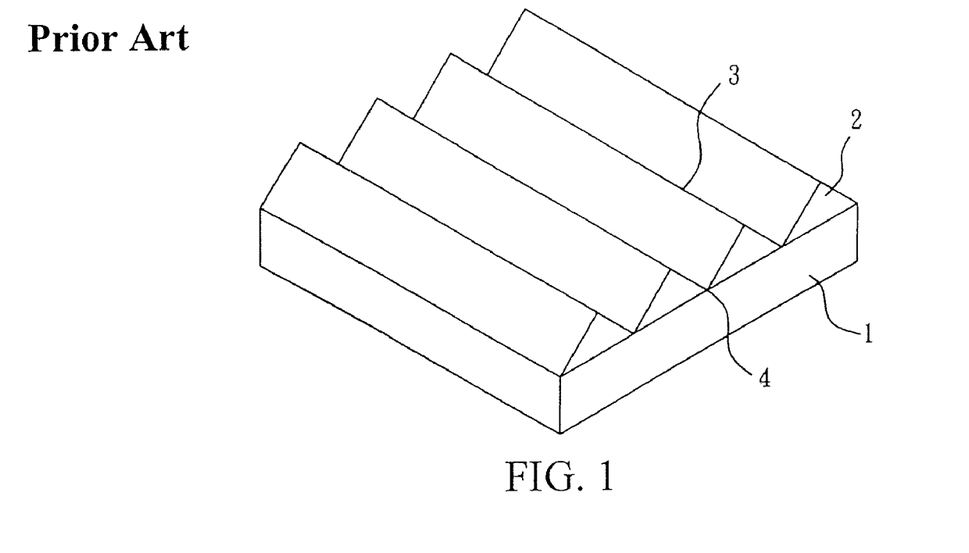
FIG. 1 is a schematic diagram of a conventional brightness enhancing film.

The light-condensing film, also referred to as brightness enhancing film or prism film in this field, has micro strip-shaped prism structures formed by curing a special acrylic resin with energetic UV light on a polyester optical film having a thickness of merely 50-200 μm, where the micro strip-shaped prism structures are parallel to each other. The main function of the brightness enhancing film involves gathering the scattered light rays coming from the lightguide plate in all directions by means of refraction and internal total reflection, and converging the light rays in the on-axis direction of about ±35 degrees to enhance the luminance of the LCDs. FIG. 1 is a schematic diagram of a conventional brightness enhancing film. As shown in FIG. 1, a plurality of micro strip-shaped prism structures (2) is arranged on the substrate (1), and the strip-shaped prism structures are parallel to each other. Each prism structure is composed of two slant surfaces, where the two slant surfaces meet at the top of the prism to form a pit (3), and every two prisms meet to form a groove (4). The brightness enhancing films disclosed in the prior art have regular strip-shaped structures having a fixed width, such that an optical interference caused by the light rays refracted or reflected by other films of the displays or by other light rays refracted or reflected by the brightness enhancing film occurs, thereby resulting in Moiré or Newton ring in appearance.

Figure 2:
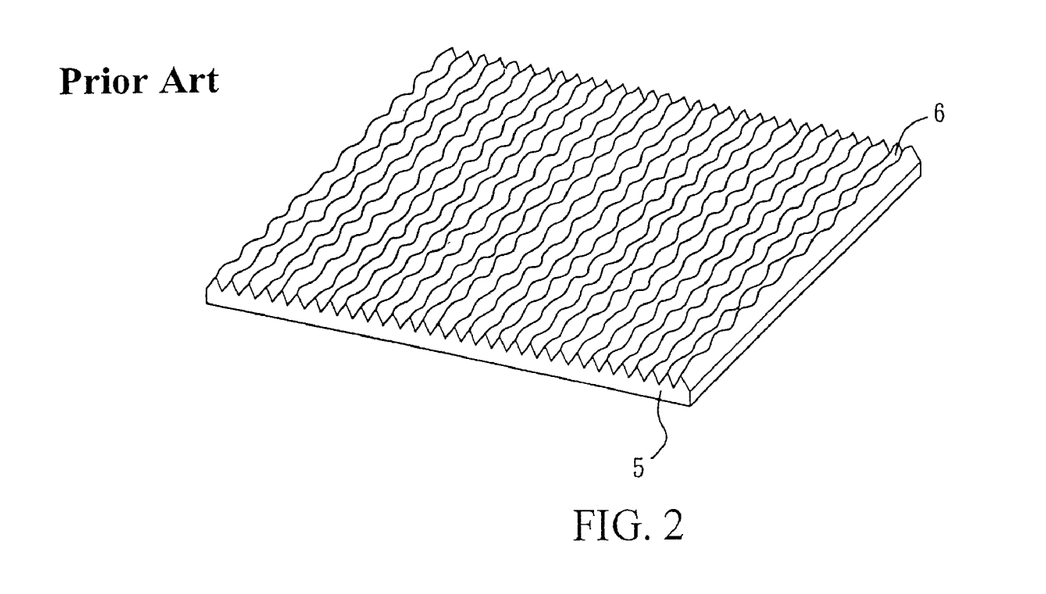
FIG. 2 is a schematic diagram of a conventional brightness enhancing film.

Currently, there are many published patent documents that are related to brightness enhancing films, the improvements and fabrication methods thereof, and methods of applying the same to backlight modules. The prior art has disclosed methods to improve the brightness enhancing films. For example, U.S. Pat. No. 5,919,551 discloses using two sets of prism structures with different pit distance (i.e., the distance between two adjacent pits) to prepare a brightness enhancing film. In U.S. Pat. No. 5,771,328, a method of using two sets of prism structures with different pit heights to prepare a brightness enhancing film is disclosed, in which the pit heights refer to the distance from the pit to a reference surface (for example, the upper surface of the substrate). In the prism structures used in U.S. Pat. No. 5,919,551 and 5,771,328, a single prism structure has a single pit height. U.S. Pat. No. 6,354,709 discloses a method of using a single prism structure with different pit heights (i.e., the pit line of the prism is not a straight line) to prepare a brightness enhancing film. FIG. 2 is a schematic diagram of a brightness enhancing film of U.S. Pat. No. 6,354,709, in which a plurality of micro prism structures (6) is arranged on the substrate (5). These prism structures are parallel to each other, and a single prism structure has different pit heights at different lengths. However, even though the pit distances or pit heights of conventional brightness enhancing films are changed, the brightness enhancing structures are still regular; that is, the prisms are parallel to each other (i.e., having parallel pits or parallel grooves). Therefore, the optical interference cannot be alleviated effectively. A solution proposed in the industry is to dispose a piece of diffusion film above the brightness enhancing film, which however suffers from the disadvantages associated with increased costs and complex backlight modules. Moreover, since the conventional brightness enhancing film has a regular brightness enhancing structure, when the brightness enhancing structure is damaged, for example, the apex angle of the prism structure is dented, the light gathering effect will be adversely affected or dark spots occur on the panel. Therefore, it is necessary for the brightness enhancing films to have a high hardness and undamaged brightness enhancing structure, which however, results in an increase on the preparation cost.

The present invention provides an optical film to eliminate the above disadvantages. The optical film of the present invention has non-parallel, adjacent columnar structures, and can gather the light rays and reduce the optical interference. Additionally, as compared with the prior art, the optical film of the present invention can be produced at a lower cost due to an irregular brightness enhancing structure and a less strict processing requirement.

SUMMARY OF THE INVENTION

The present invention is mainly directed to an optical film for enhancing the brightness of a flat display and reducing optical interference. The present invention provides an optical film which includes a transparent substrate and a structured surface layer, wherein the structured surface layer is disposed on the upper surface of the transparent substrate and includes a plurality of non-parallel, adjacent columnar structures.

DETAILED DESCRIPTION OF THE INVENTION

The transparent substrate for the optical film of the present invention can be any of the substrates known to persons of ordinary skill in the art, such as glass or plastic substrate. The plastic substrate is not particularly limited, and includes, but is not limited to, a polyester resin, such as polyethylene terephthalate (PET); a polyacrylate resin, such as polymethyl methacrylate (PMMA); a polyolefin resin, such as polyethylene (PE) or polypropylene (PP); a polycycloolefin resin; a polyimide resin; a polycarbonate resin; a polyurethane resin; triacetate cellulose (TAC); or a mixture thereof, among which the polyester resin and polyacrylate resin are the preferred ones. The thickness of the substrate usually depends on the requirement of the desired optical product, and is preferably between about 50 μm (micron) to about 300 μm.

In order to achieve a brightness enhancing effect, the optical film of the present invention includes a structured surface layer serving as a brightness enhancing layer on the upper surface of the substrate. The structured surface layer of the optical film of the present invention can be composed of any resin that has a refractive index higher than that of air. In general, the higher the refractive index is, the better effect there will be. The optical film of the present invention has a refractive index of at least 1.50, preferably from 1.50 to 1.7. The resin for the structured surface layer can be, for example, the thermo-curable resins or UV-curable resins that are known to persons of ordinary skill in the art, of which UV-curable resins are preferred. The species of the UV-curable resins include, but are not limited to, acrylate resins. The acrylate resins that can be used in the present invention include, for example, but are not limited to, (meth)acrylate resins, urethane acrylate resins, polyester acrylate resins, epoxy acrylate resins, or a mixture thereof, among which (meth)acrylate resins are preferred.

Examples of the (meth)acrylate resins that can be used in the present invention are, for example, selected from the group consisting of (meth)acrylate, tripropylene glycol di(meth)acrylate, 1,4-butanediol di(meth)acrylate, 1,6-hexanediol di(meth)acrylate, polyethyleneglycol di(meth)acrylate, allylated cyclohexyl di(meth)acrylate, isocyanurate di(meth)acrylate, 2-phenoxyl ethyl (meth)acrylate, ethoxylated trimethylol propane tri(meth)acrylate, propoxylated glycerol tri(meth)acrylate, trimethylol propane tri(meth)acrylate, and tris(acryloxyethyl) isocyanurate resins, and a mixture thereof.

The examples of the commercially available monomers that can be used to synthesize the (meth)acrylate resins include, for example, those with the trade names SR454®, SR494®, SR9020®, SR9021®, and SR9041®, produced by Sartomer Company; those with the trade names 624-100® and EM210®, produced by Eternal Company; and those with the trade names Ebecryl 600®, Ebecryl 830®, Ebecryl 3605®, and Ebecryl 6700®, produced by UCB Company.

Any conventional additive, for example, photo initiator, crosslinking agent, inorganic filler, leveling agent, antifoaming agent, or antistatic agent can be optionally added to the resin for the structured surface layer.

Figure 3A:
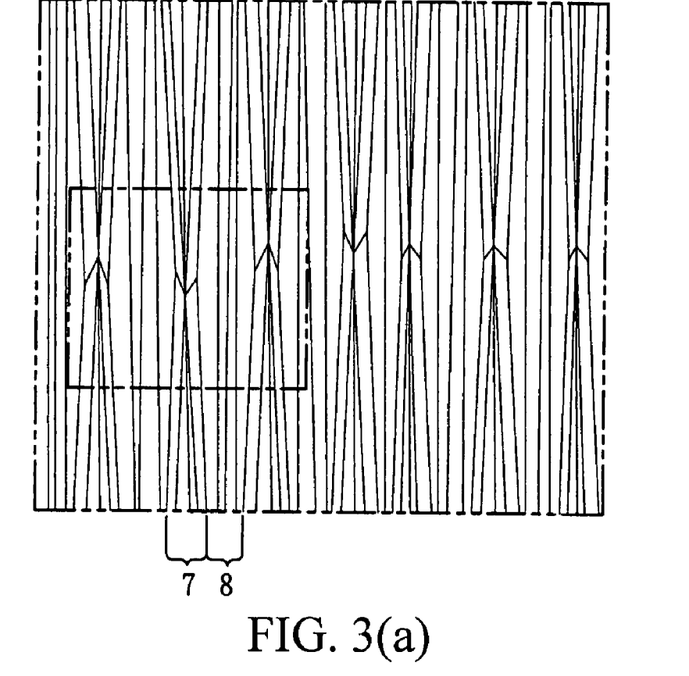
FIG. 3(a) is a top view of an optical film of the present invention.
Figure 3B:
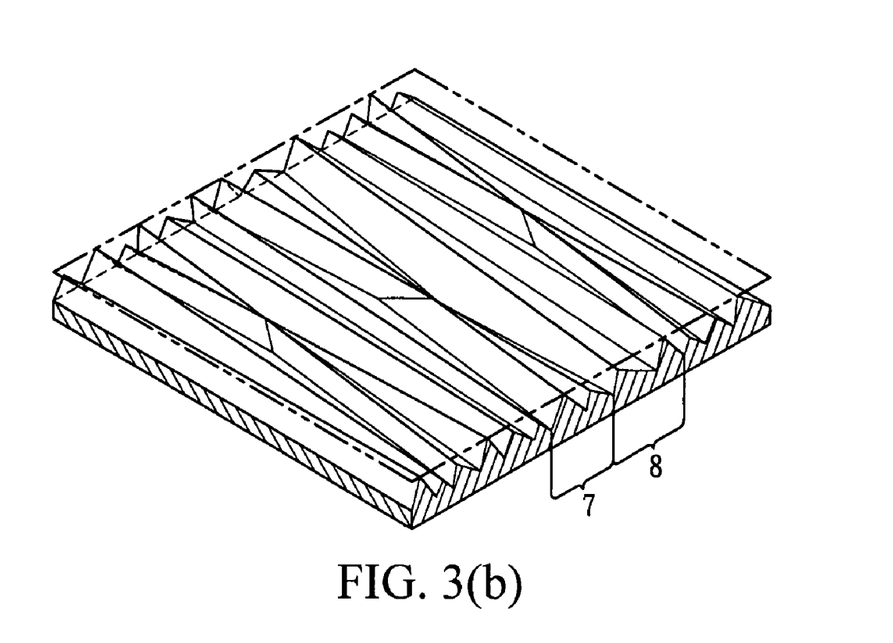
FIG. 3(b) is a side view of a selected region in FIG. 3(a).
Figure 4:
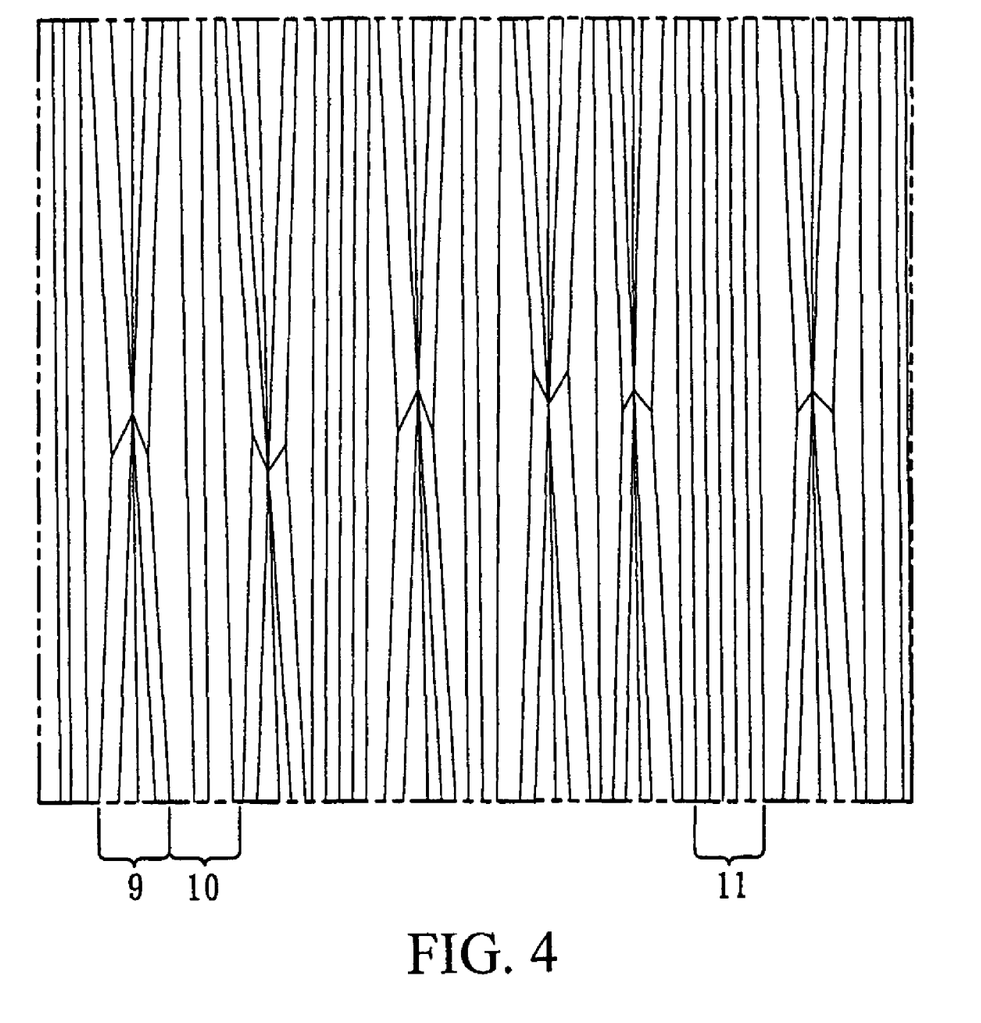
FIG. 4 is a top view of another optical film of the present invention.

The structured surface layer of the optical film of the present invention is positioned on the upper surface of the substrate, and includes a plurality of non-parallel, adjacent columnar structures. The shape of the columnar structures is not particularly limited, which may be, for example, linear, zigzag, or winding. According to the present invention, the structured surface layer may include a set of two non-parallel, crossed columnar structures and/or a set of two non-parallel, non-crossed columnar structures. It is possible that the structured surface layer has some parallel columnar structures. FIGS. 3(a) and 3(b) are schematic diagrams of the optical film of the present invention, in which the structured surface layer of the optical film is composed of non-parallel linear columnar structures. FIG. 3(a) is a top view of the optical film, and FIG. 3(b) is a side view of a selected region in FIG. 3(a). As shown in FIGS. 3(a) and 3(b), the structured surface layer of the optical film includes two non-parallel, crossed columnar structures (7) and two non-parallel, non-crossed columnar structures (8). FIG. 4 is a schematic diagram of another optical film of the present invention, in which the structured surface layer of the optical film is mainly composed of non-parallel linear columnar structures, and additionally has parallel linear columnar structures. As shown in FIG. 4, the structured surface layer of the optical film includes two non-parallel, crossed columnar structures (9), two non-parallel, non-crossed columnar structures (10), and two parallel columnar structures (11).

The pattern of the columnar structure is well known to persons of ordinary skill in the art, which can be prismatic columns or arc columns or a combination thereof, preferably prismatic columns. The arc columns have blunt or rounded pits. The apex angle of the prism columns is in a range from 50° to 120°, preferably from 85° to 95°. According to the present invention, the respective apex angles of the two adjacent prisms can be the same or different, and the same prism can have different apex angles at different sections. The structured surface having a prism column has a good brightness enhancing performance, so as to enhance the brightness of displays.

FIGS. 5, 6, 7, and 8 are cross-sectional views illustrating the embodiments of the optical films of the present invention. The optical film in FIG. 5 has a structured surface layer composed of a plurality of prism columnar structures (13) with the same tip height (111) on the substrate (12). The optical film in FIG. 6 has a structured surface layer composed of a plurality of prism (15) structures with different apex angles (112), widths (113), and tip heights (111) on the substrate (14). The optical film in FIG. 7 has a structured surface layer composed of a plurality of arc columnar structures (17) on the substrate (16), and the tips and grooves of the columnar structures are circular arc-shaped. The optical film in FIG. 8 has a structured surface layer composed of a plurality of prism columnar structures (19) with the same or different pit heights and a plurality of arc columnar structures (20) with the same or different pit heights on the substrate (18).

Figure 5:
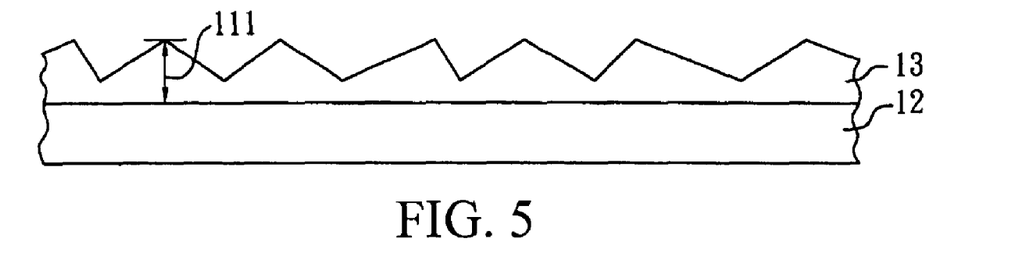
FIGS. 5 to 8 are cross-sectional views of the optical films of the present invention.
Figure 6:
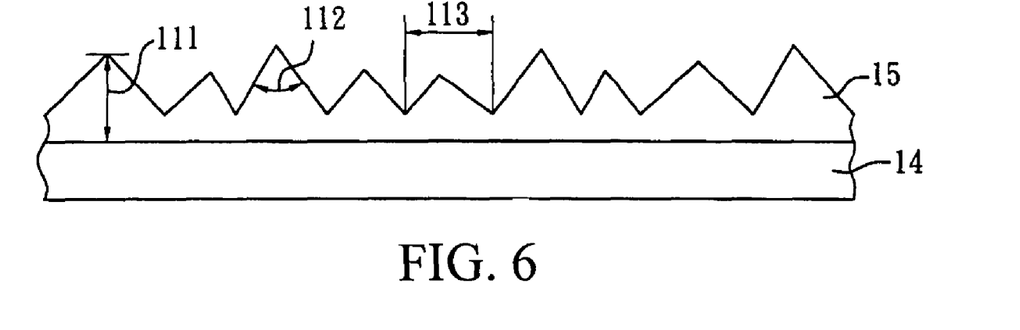
Figure 9:
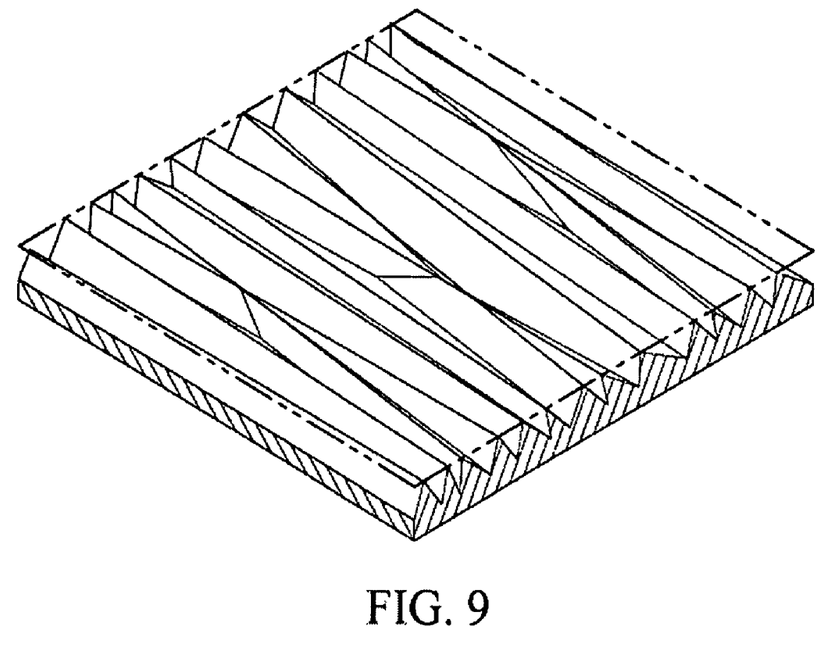
FIG. 9 is a side view of another optical film of the present invention.

Referring to FIGS. 5 and 6, the tip height (111) of the columnar structure of present invention means the distance from the top of the columnar structure (for example, the tip of the prism structure) to the upper surface of the substrate. According to the present invention, the tip height is generally from 5 μm to 100 μm, preferably from 10 μm to 40 μm. The respective tip heights of the two adjacent prism structures can be the same or different. As shown in FIG. 3(b), according to the present invention, the structured surface layer includes two adjacent prism structures that have different tip heights. As shown in FIG. 9, according to the present invention, the structured surface includes two adjacent prism structures that have the same tip height. Additionally, the same prism may have different tip heights at different sections.

Referring to FIG. 6, the width (113) of the columnar structure of the present invention is defined as the distance between two grooves of the columnar structures. According to the present invention, the structured surface layer may include a plurality of columnar structures that have different widths, and one columnar structure can have different widths at different sections so as to form non-parallel columnar structures.

The width of the columnar structure is in a range from 1 μm to 100 μm. The preferred width is selected depending on the pixel pitch of the liquid crystal display, and the selected width should contribute to reducing the Moiré interference.

Figure 7:
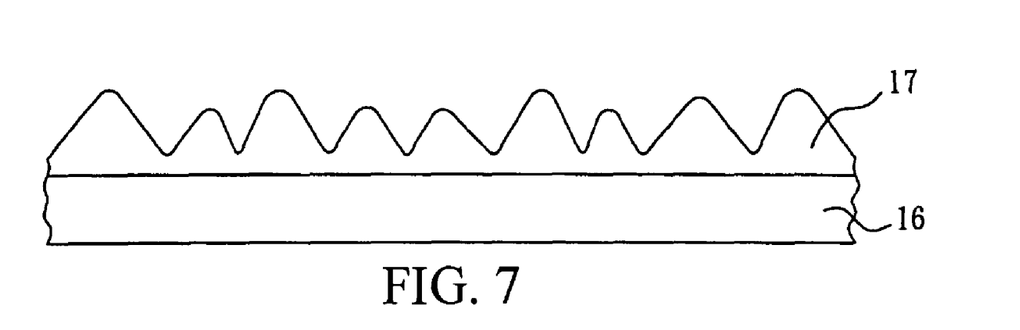
Figure 8:
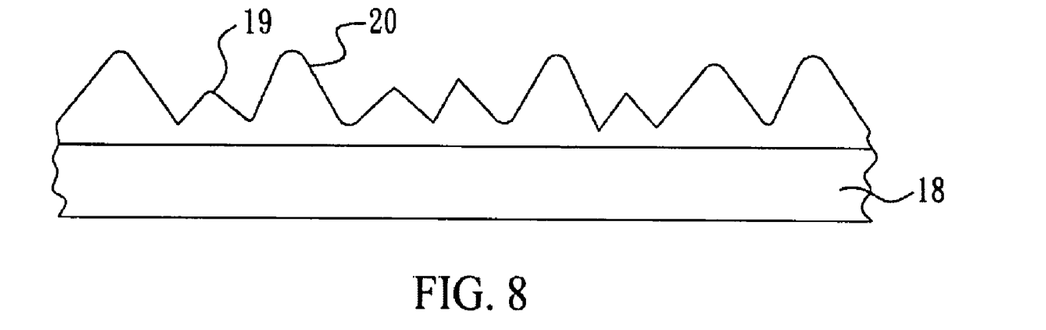

Referring to FIG. 7, the structured surface is composed of arc columnar structures, so as to prevent an overlaid optical film from getting scratched. Referring to FIG. 8, the structured surface layer is composed of a plurality of prism columnar structures (19) and a plurality of arc columnar structures (20). The arc columnar structures have higher tip heights as compared with those of the prism columnar structures, so as to prevent the optical film of the present invention or other films from getting scratched, to achieve a light diffusion effect, and to reduce the Moiré interference. The prism columnar structures have lower tip heights, and achieve a brightness enhancing effect.

Figure 10:
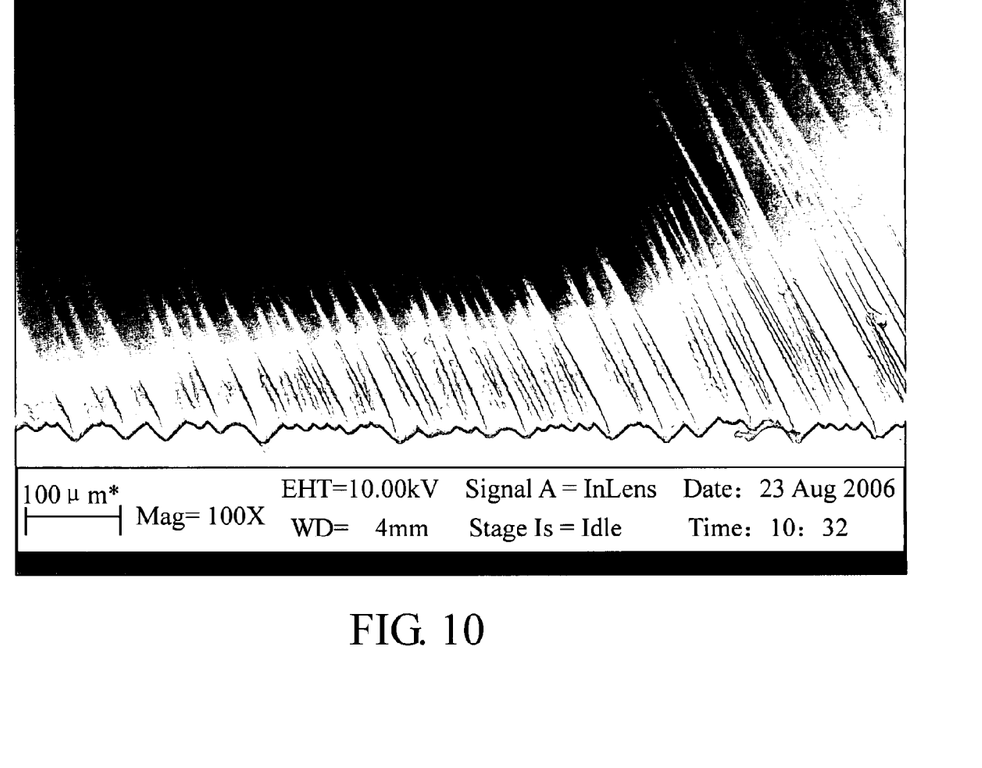
FIG. 10 is a scanning electronic microscopy (SEM) photograph of the optical film according to the present invention.

FIG. 10 is a scanning electronic microscopy (SEM) photograph of the optical film according to the present invention. As shown in FIG. 10, the optical film has a structured surface layer on the substrate surface. The structured surface layer is substantially composed of non-parallel prism structures, and the two adjacent columnar structures can have different apex angles, widths, and tip heights.

Since the structure of the conventional brightness enhancing film is extremely regular, when the film is used together with other components, the so-called "Reflective Moiré" occurs due to the interference caused by the directly refracted and double-refracted light. Since the optical film of the present invention has a structured surface layer, and the structured surface layer includes the non-parallel, adjacent columnar structures, the optical film of the present invention possesses a combination of the characteristics of a conventional brightness enhancing film and diffusion film, such that the optical interference caused by the regular brightness enhancing structure can be reduced while the brightness enhancing effect is retained. As compared with the conventional brightness enhancing film, the optical film of the present invention can maintain at least 90% or more of the brightness value of the conventional brightness enhancing film, while achieving the effect on reducing the interference.

The pattern of the lower surface of the substrate of the optical film of the present invention is not particularly limited, and can be, for example, smooth or unsmooth, which is well known to persons of ordinary skill in the art. The method for forming the smooth or unsmooth lower surface is well known to persons of ordinary skill in the art. For example, a hardmask solution may be applied to the lower surface of the substrate to form a coating layer, and then the coating layer is irradiated with UV light so as to form a smooth hard coat layer. Alternatively, micro concave or convex structures can be formed on the lower surface of the substrate so as to obtain an unsmooth lower surface, thus achieving light diffusion effect. The micro concave or convex structures can be formed by any conventional method, which is, for example, but not limited to, screen printing, spray coating, embossing process, or a method of applying a coating layer containing particles to the substrate surface.

The optical film of the present invention can be fabricated by any conventional method which is known to persons of ordinary skill in the art. For example, it may be produced by the method comprising the following steps:

(a) mixing the resin with an appropriate additive to form a colloidal coating composition;
(b) moving a diamond tool on a rotating cylindrical roll (referred to as the "roller") in a direction transverse to the roller, and carving specific grooves on the roller with the diamond tool by controlling the movement speed of the diamond tool and/or the rotation speed of the roller;
(c) applying the colloidal coating composition onto a substrate, and then performing a roller embossing, thermo-transfer printing, or thermo-extruding on the carved roller obtained from step (b) so as to form a structured surface layer; and
(d) irradiating and/or heating the coating layer to cure the coating layer.

Preferably, in Step (b), the movement speed of the diamond tool can be controlled by electrical signals, for example, by a fixed frequency or random frequencies. When the random frequencies were used, Step (b) was repeated to acquire multiple non-parallel grooves, and to also produce crossed grooves. Preferably, the curing step of Step (d) was performed by irradiation to cause photo polymerization. The irradiation was performed with a light source in a certain wavelength range, which is, for example, UV light, infrared light, visible light, or heat rays (nucleus rays or radiation rays), and preferably UV light. The intensity of the irradiation was in a range from 1 to 500 mJ/cm2, preferably from 50 to 300 mJ/cm2.

The optical film of the present invention can be used in displays, particularly in liquid crystal displays, and disposed above the light-out plane of the light source device. The optical film of the present invention has a structured surface layer formed on the substrate, and the structured surface layer has a plurality of non-parallel columnar structures. The optical film of the present invention has both light diffusing and light enhancing properties, thus achieving a brightness enhancing effect, thereby enhancing the overall brightness of the display, and meanwhile reducing the optical interference. Therefore, the optical film of the present invention can be used as a brightness enhancing film in the backlight module of the display.

The following examples are used to further illustrate the present invention, and are not intended to limit the scope of the present invention. Any modifications and changes that can be achieved by persons skilled in the art are within the scope of the disclosure of the specification and the appended claims.

EXAMPLE 1

Preparation of the Optical Film of the Present Invention 60 g EM210® (2-phenoxyethylacrylate, sold by Eternal Company) and 60 g 624-100® (epoxy acrylate, sold by Eternal Company) were mixed, and then 5 g Chivacureg® BP was added as photo initiator (benzophenone, provided by Double Bond Chemical), and the mixture was stirred at 1000 rpm at 50° C. to form a colloidal coating composition.

The colloidal coating composition was coated onto a PET substrate (U34®, produced by TORAY Company) to form a coating layer, and then a structured surface layer is formed on the coating layer by roller embossing. The structured surface layer includes a plurality of non-parallel, adjacent linear prism patterns. Thereafter, the coating layer was cured by irradiation with energetic radiation at normal temperature.

EXAMPLE 1-1

Property Test on the Optical Film of the Present Invention

Figure 11:
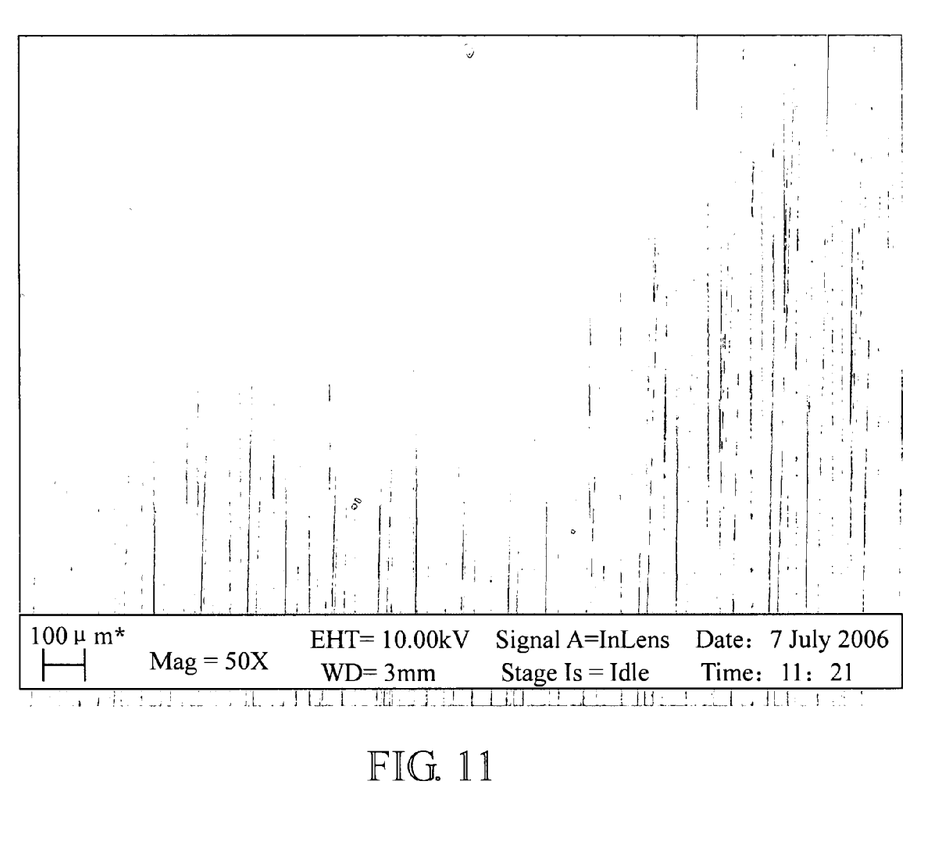
FIG. 11 is a SEM photograph of the optical film of the present invention.

The optical film prepared in Example 1 was tested by SEM, and the results were as shown in FIG. 11. Moreover, the brightness enhancement test of the optical film prepared in Example 1 was carried out with the BM-7® instrument provided by TOPCON Company, and the result was as shown in Table 1.

EXAMPLE 1-2

Property Test on Conventional Brightness Enhancing Film

Figure 12:
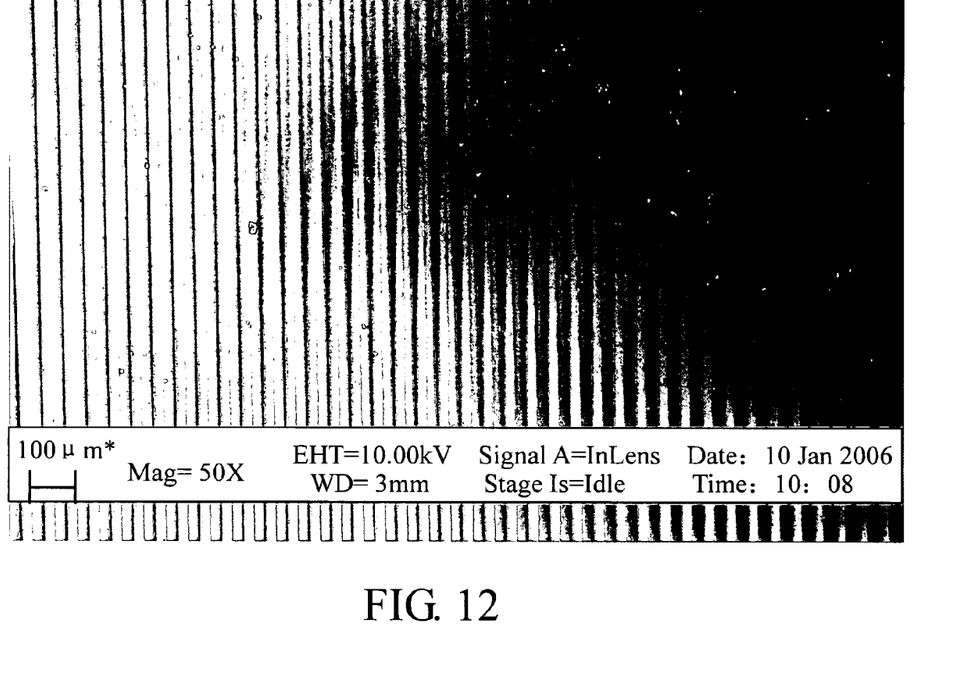
FIG. 12 is a SEM photograph of a conventional brightness enhancing film.

A conventional brightness enhancing film was tested by SEM, and the results were as shown in FIG. 12. Moreover, the brightness enhancement test of such film was carried out with the BM-7® instrument provided by TOPCON Company, and the result was as shown in Table 1.

TABLE 1

| Example No. | Brightness Gain |
|---|---|
| Example 1-1 | 56% |
| Example 1-2 | 58% |

As can be seen from Table 1, as compared with the conventional brightness enhancing film, the optical film according of the present invention has a brightness gain of about 99% of that of the conventional brightness enhancing film.

EXAMPLE 2

The conventional brightness enhancing film and the optical film prepared according to Example 1 were used as a upper prism film or lower prism film, and were assembled together with a light guide plate and a diffusion film (DI 700A, Eternal Chemical CO., LTD.) on a backlight module (32WA01, Forward Electronics) in the following order:
1. light guide plate
2. diffusion film
3. lower prism film
4. upper prism film After assembling, a light source was turned on for 20 minutes, and after the current became stable, the brightness was measured with BM-7® instrument and the optical interference (Moiré) was inspected by human eyes. The results were as shown in Table 2 below.

TABLE 2

| Example No. | Lower Prism Film | Upper Prism Film | Brightness Gain | Moiré |
|---|---|---|---|---|
| Example 2-1 | conventional brightness enhancing film | conventional brightness enhancing film | 98% | Yes |
| Example 2-2 | conventional brightness enhancing film | optical film of the present invention | 98% | No |
| Example 2-3 | optical film of the present invention | optical film of the present invention | 97% | No |

It can be seen from Table 2 that if the optical film of the present invention is used to replace the conventional brightness enhancing film as the upper prism or both the upper prism and lower prism, no optical interference occurs and a comparable brightness gain is obtained. Therefore, the optical film of the present invention can reduce the optical interference and effectively improve the efficiency of the light source.

FIGS. 11 and 12 are the photographs of SEM of the optical film of the present invention and the conventional brightness enhancing film. Referring to FIGS. 11 and 12 together, it can be found that the conventional brightness enhancing film has distinct light-and-dark stripes caused by the optical interference, whereas the optical film of the present invention does not have distinct light-and-dark stripes. Referring to the results in Table 2 again, it is known that since the conventional brightness enhancing film has regular columnar structures, the distinct light-and-dark stripes are generated, which shows that there is optical interference. If the optical film of the present invention is used to replace the conventional brightness enhancing film, the brightness gain is almost the same. However, since the structured surface layer of the optical film of the present invention has non-parallel columnar structures, the generation of the light-and-dark stripes can be alleviated and the light-and-dark stripes are obscure, and the optical interference is effectively reduced.

We claim:

1. An optical film, comprising:
   a plastic substrate, and
   a structured surface layer, positioned on one side of the substrate,
   wherein the structured surface layer has an irregular brightness enhancing structure that comprises a plurality of non-parallel, adjacent columnar structures, wherein the plurality of non-parallel, adjacent columnar structures a set of two non-parallel, crossed columnar structures and a set of two non-parallel, non-crossed columnar structures.

2. The optical film as claimed in claim 1, wherein the columnar structures are selected from the group consisting of prismatic columns, arc columns and a combination thereof.

3. The optical film as claimed in claim 1, wherein the columnar structures are prism columns.

4. The optical film as claimed in claim 3, wherein the prism columns have an apex angle in a range from 50° to 120°.

5. The optical film as claimed in claim 4, wherein the apex angle of the prism columns is in a range from 85° to 95°.

6. The optical film as claimed in claim 1, wherein the columnar structures are arc columns.

7. The optical film as claimed in claim 1, wherein the columnar structures comprise a combination of prism columns and arc columns.

8. The optical film as claimed in claim 1, wherein the plurality of non-parallel, adjacent columnar structures are linear.

9. The optical film according to claim 1, wherein the structured surface layer is produced by forming a colloidal coating layer on the plastic substrate and then roller embossing with a roller having grooves that form said structured surface layer with said plurality of non-parallel, adjacent columnar structures.

10. An optical film, comprising:
    a polyester resin substrate, and
    a structured surface layer, positioned on the upper surface of the substrate,
    wherein the structured surface layer has an irregular brightness enhancing structure that comprises a plurality of non-parallel, adjacent linear prism columnar structures, wherein the plurality of non-parallel, adjacent linear prism columnar structures comprise a set of two non-parallel crossed linear prism columnar structures and a set of two non-parallel, non-crossed linear prism columnar structures, the width of the columnar structures is in a range from 1 μm to 100 μm, and the optical film has a refractive index of at least 1.50.

11. The optical film as claimed in claim 10, wherein the structured surface layer further comprises a set of two columnar structures parallel to each other.

12. The optical film as claimed in claim 10, wherein the prism columnar structures have an apex angle in a range from 50° to 120°.

13. The optical film as claimed in claim 12, wherein the apex angle of the prism columnar structures is in a range from 85° to 95°.

14. The optical film as claimed in claim 10, wherein the structured surface layer is composed of a (meth)acrylate resin.

15. The optical film as claimed in claim 10, wherein the lower surface of the substrate is smooth.

16. The optical film as claimed in claim 10, wherein the lower surface of the substrate is unsmooth.

17. The optical film according to claim 10, wherein the structured surface layer is produced by forming a colloidal coating layer on the plastic substrate and then roller embossing with a roller having grooves that form said structured surface layer with said plurality of non-parallel, adjacent linear prism columnar structures.

18. A liquid crystal display, comprising:
   a surface light source device; and
   an optical film disposed above the light-out plane of the surface light source device,
   wherein the optical film has a structured surface layer, and the structured surface layer has an irregular brightness enhancing structure that comprises a plurality of non-parallel, adjacent columnar structures, wherein the plurality of non-parallel, adjacent columnar structures comprise a set of two non-parallel, crossed linear prism columnar structures and a set of two non-parallel, non-crossed linear prism columnar structures.

19. The liquid crystal display according to claim 18, wherein the structured surface layer is produced by forming a colloidal coating layer on the plastic substrate and then roller embossing with a roller having grooves that form said structured surface layer with said plurality of non-parallel, adjacent columnar structures.

* * * * *